April 3, 1934.  W. T. HONISS  1,953,407

HEAT CONTROL MEANS FOR FOREHEARTHS

Filed Sept. 4, 1930   2 Sheets-Sheet 1

Witness:
G. A. Duberg.

Inventor:
William T. Honiss
by Brown & Parham
Attorneys.

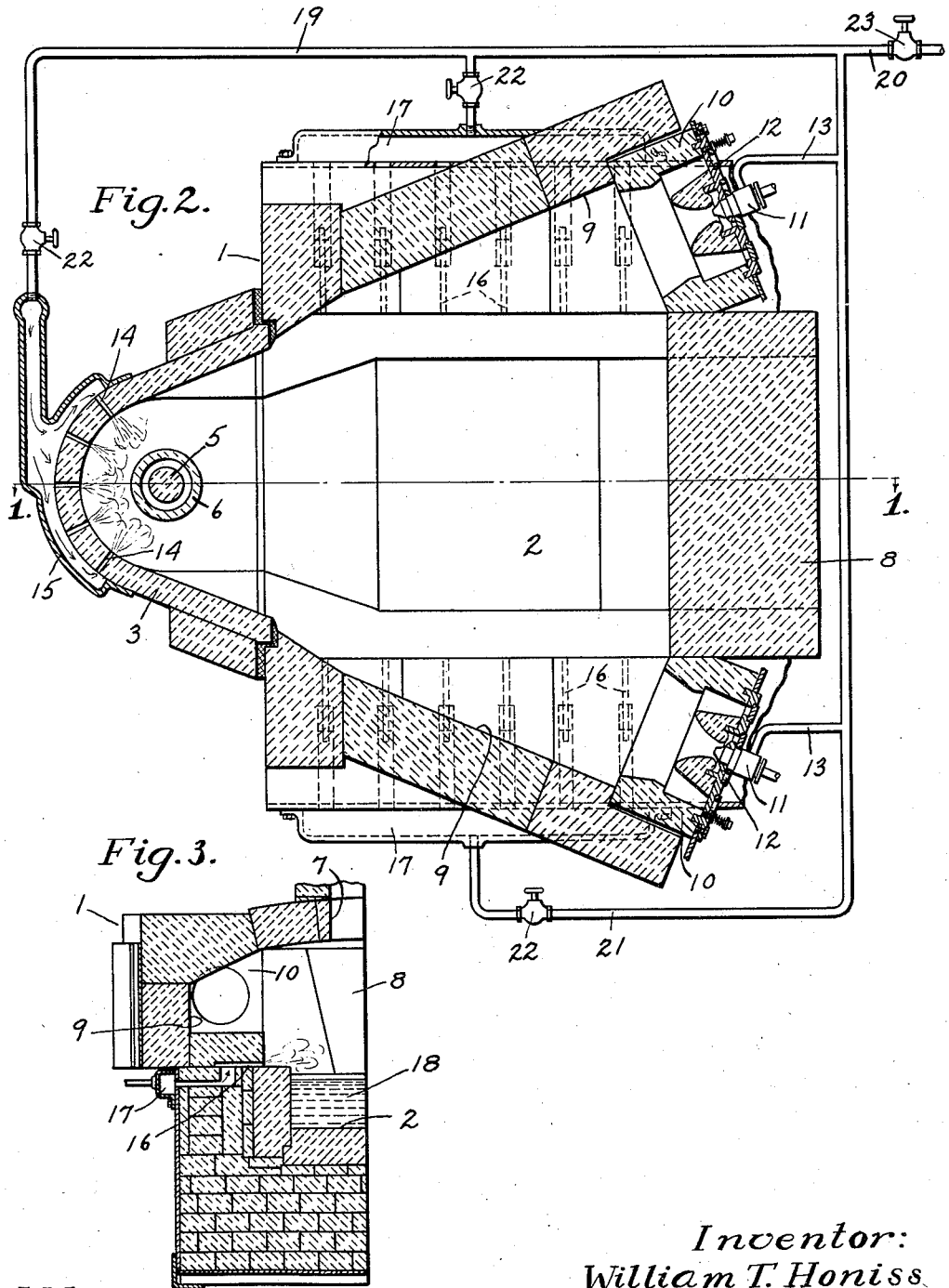

Patented Apr. 3, 1934

1,953,407

UNITED STATES PATENT OFFICE 1,953,407

HEAT CONTROL MEANS FOR FOREHEARTHS

William T. Honiss, West Hartford, Conn., assignor to Hartford-Empire Company, Hartford, Conn., a corporation of Delaware Application September 4, 1930, Serial No. 479,603

3 Claims. (Cl. 49—55)

This invention relates generally to the heating of glass in forehearths, particularly in such forehearths as are provided with a burner or burners for projecting a combustible fuel or mixture in combustion into the space above the glass in the forehearths.

It is well known that the side portions of a stream or body of glass in a glass conducting forehearth furnace extension or like container tend to become cooler than the middle portion of the stream and that the glass at the front or outer end of such container likewise tends to become relatively cool, particularly where such glass is shaded by a vertically disposed discharge regulating or other refractory implement from heat from the usual forehearth burner or burners and against radiation from the main body of glass. The occurrence of a so-called "cold spot" in the glass at the front of a glass feeding forehearth, and of zones of relatively cool glass at the side portions of the stream adjacent to the feeding outlet of the forehearth are objectionable in that they may prevent desirable uniformity of temperature and viscosity in the glass that passes to and through the feeder outlet.

An object of the present invention is to improve temperature conditions in the glass in a burner-fired forehearth by providing for intensified heating of the glass at the particular place or places where the glass tends to become relatively cool.

A further object of the invention is to prevent a zone or zones of relatively cool glass in a burner-fired forehearth by providing means effective in cooperation with the burner or burners to effect locally increased combustion and heating of the glass at the place or places where the glass otherwise would be insufficiently heated by the normal combustion of fuel from the burners in the space above the glass in the forehearth.

A still further object of the invention is to provide for automatic variation of the amount of increase or intensification of heating effect at the place or places above referred to when the amount and character of the combustible mixture that is supplied by the forehearth burner or burners are varied.

In one practical embodiment of the present invention, a glass forehearth having a burner or burners arranged to discharge a combustible mixture or mixture in combustion into the space above the glass therein is provided with air inlet ports for admitting jets of air into the forehearth at the places where the heating action on the glass would be insufficient to produce the desired temperature therein. Such air jets serve to promote and support combustion locally at the places where more heat is required, and thus produce an intensified heating action on the glass at such places.

In another embodiment of the invention, the mixture in combustion within the forehearth and the heated gases of such combustion are directed by combustion promoting and supporting streams or jets of air against a roughened internal surface of a refractory member from which heat may be radiated directly onto the glass at a place where such glass ordinarily would be insufficiently heated. A vent or outlet for the products of combustion is provided adjacent to this roughened surface. A baffle prevents the mixture in combustion and the heated gases from entering such vent or outlet without first impinging against the roughened surface of the refractory member.

In the drawings,

Fig. 2 is a horizontal section through the forehearth structure of Fig. 1, the view being taken substantially along the line 2—2 of Fig. 1;

Fig. 3 is a reduced fragmentary vertical section through a portion of the forehearth structure, the view being taken substantially along the line 3—3 of Fig. 1;

Figure 1:
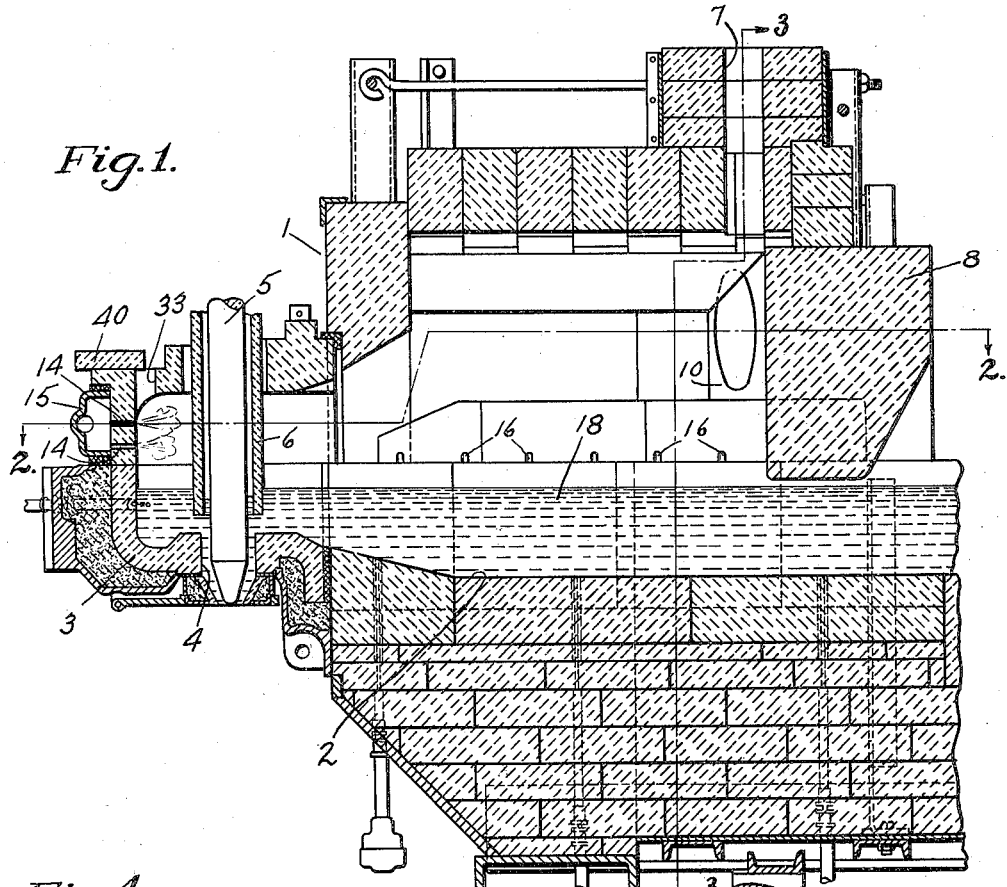
Figure 1 is a longitudinal vertical section through a forehearth equipped with heat control means embodying the invention, the view being taken substantially along the line 1—1 of Fig. 2.

Referring now to the drawings, I show in Figs. 1 and 2 a forehearth 1 having a glass conducting channel 2 leading to a feed spout 3. The feed spout 3 has a bottom discharge outlet 4 through which glass may be fed under the control of the vertical refractory implement 5, and to which glass may flow under the control of the tube 6.

The cover or upper portion of the forehearth structure may be formed to provide a controllable stack or outlet 7 at the front of a transverse refractory member 8 which depends nearly to the level of the glass in the flow channel 2, and substantially separates the space above the glass in the forehearth in front of the member 8 and in the feed spout from the space above the glass at the rear of the member 8.

The space above the glass in the channel 2 may have side portions, such as indicated at 9 in Fig. 2. Burner blocks 10 may be provided at the rear of the spaces 9 and burners, such as indicated at 11, may be disposed in suitable positions to discharge a combustible fuel or mixture in combustion forwardly through the spaces 9 toward the space above the glass in the feeder spout. Suitable means, such as the air registers indicated generally at 12, may be associated with burners 11 and with the burner blocks 10 for admitting air into the spaces 9 to promote combustion of the fuel from the burners and to aid in projecting the flames of combustion and unconsumed combustible fuel forwardly and inwardly toward the space above the glass in the feed spout. Also, the burners 11 may be provided with supply pipes 13 for supplying atomizing air to the burners to aid combustion at and adjacent to the burner tips. A burner of this type is well-known in the part and, per se, performs no part of the present invention.

A stack or outlet 33, controllable as by the member 40, also may be provided at the front of the feed spout. The stacks 7 and 33 may be used in cooperation with the burners and the air registers to control the extent and location of the primary combustion within the forehearth and generally to control draft and temperature conditions therein.

The construction of Figs. 1 and 2, as described so far, is substantially that which forms a part of the improved forehearth structure of the application of Vergil Mulholland, filed June 14, 1930, Serial No. 461,132, and such structure, per se, forms no part of the present invention.

The glass between the flow regulating tube 6 and the front or outer end wall of the feed spout may be shaded more or less from heat resulting from the combustion within the main portion of the forehearth. The invention, therefore, provides means for effecting localized heating of the glass at the front of the feed spout. Such means may take the form of air inlet ports 14, Figs. 1 and 2, through which jets of air may be projected from a manifold 15 into the space above the glass in the front part of the feed spout.

Air inlet ports 16, Figs. 1, 2 and 3, may also be provided in the side walls of the forehearth structure for projecting jets of air from manifolds 17 into the spaces above the side portions of the stream of glass 18 in the forehearth channel.

The manifolds 15 and 17 preferably are connected with the same source of supply of air under pressure, as the atomizing air pipes 13 of the burners. In a particular construction that is best seen in Fig. 2, the manifold 15 is connected with a pipe 19 which leads to the main supply pipe 20. One of the manifolds 17 is connected with the pipe 19 while the other manifold 17 is connected with a pipe 21 which also is connected with the pipe 20 and with the atomizing air pipes 13 for the burners 11. Valves 22, which may be needle valves or valves of any other suitable type, are provided for independently controlling the volume of air that will be supplied from the common supply pipe 20 to each of the respective manifolds. The supply pipe 20 likewise may be provided with a regulating valve, such as indicated at 23.

The operation of the embodiment of the invention illustrated in Figs. 1 to 3, inclusive, may be substantially as follows.

The burners 11 and the air intake valves or registers 12 may be adjusted to project into the forehearth combustible mixtures which will burn with a relatively soft flame, that is, mixtures which are relatively slow burning but which will produce sufficient heat to maintain the main portion of the glass stream 18 at the temperature desired. The air from the ports 16 at the sides of the forehearth channel fill promote combustion locally above the side portions of the glass stream and, therefore, will produce an intensified heating of the glass in the side portions of the channel 2. Also, the air jets from the ports 14 at the front of the feed spout will promote combustion at that place, thus producing local heating of the glass at the front of the tube 6.

It is usual practice to provide for an automatic variation of the volume of atomizing air supplied to the burners when the volume of fuel supplied thereto is varied. Consequently, should the amount of fuel supplied to the burners 11 be increased or decreased, the volume of atomizing air supplied through the pipes 13 and also the volume of air supplied to the manifolds 17 and 15 would be similarly increased or decreased, thereby varying the increase of the heat that will be supplied to the side portions of the glass stream and to the glass at the front of the feed spout directly as general heating conditions within the forehearth are varied.

Figure 4:
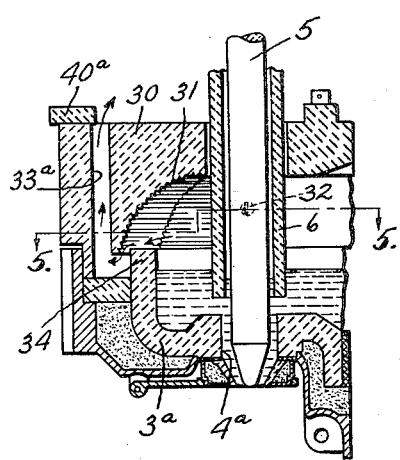
Fig. 4 is a view similar to Fig. 1, but showing only the outer end portion or feeding spout of a forehearth equipped with a modified form of the invention.
Figure 5:
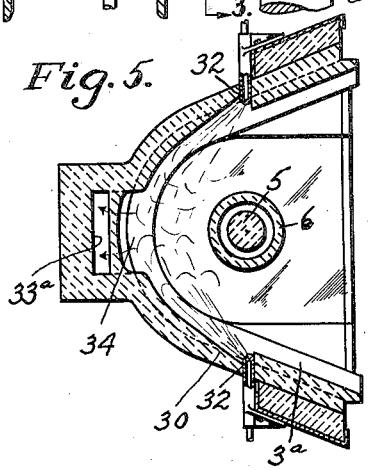
Fig. 5 is a section taken substantially along the line 5—5 of Fig. 4.

In the modified form of the invention shown in Figs. 4 and 5, the feed spout 3a has a bottom discharge outlet 4a and is provided with the discharge regulating implement 5 and tube 6, as in the form of the invention shown in the preceding figures. The feed spout 3a is provided with a cover 30 having the inner surface of its front portion roughened, as by having transverse ridges 31 formed therein. The cover 30 of the feed spout may be provided at its sides with air intake ports 32, best seen in Fig. 5, for projecting jets or streams of air into the space above the glass in the front portion of the feed spout. Such air intake ports may be connected with any suitable source of air supply, as to the supply of atomizing air for the burners in accordance with the description of the embodiment of the invention shown in Figs. 1 to 3, inclusive.

An outlet or stack 33a may be provided in the feed spout cover for the escape at the front of the feed spout of the products of combustion in the latter. The lower or inlet end of the stack 33a is located below and outwardly of an upwardly projecting portion 34 of the front wall of the feed spout. The lower edge of the roughened portion of the cover of the feed spout is located at a level not substantially above and preferably slightly below the level of the top of the portion 34 of the feed spout wall and outwardly from the latter. The portion 34 of the feed spout wall therefore serves as a baffle which will prevent heated gases, flame and any unconsumed parts of the combustible mixture from passing into the stack 33a without first being required to impinge against or contact with the roughened inner surface of the front part of the feed spout cover. The stack 33a may be controlled by the member 40a.

It will be understood that the feed spout structure, as shown in Figs. 4 and 5, may be located at the outer end of a forehearth structure, which may be substantially as shown in Figs. 1 and 2. Such forehearth may be provided with a burner or burners, substantially as hereinbefore described.

The combustible mixture from such burners will be subject to the influence of the combustion promoting and supporting air from the intake ports 32, so as to produce an intensified heating action in the front part of the feed spout. Also, the roughened surface 31 of the forehearth cover will retard the flow of the heated gases, products of combustion, flame, and any unconsumed combustible particles to the stack 33a and will aid in effecting practically complete combustion within the feed spout, thereby producing a zone of relatively intense heat above the glass in the front portion of the feed spout. Also, the roughened surface 31 of the forehearth cover will become heated because of the combustion in the front part of the feed spout, and considerable heat may be radiated therefrom onto the glass therebeneath.

While the invention has been described as applied to a glass forehearth and particularly to the feed spout at the outer end of such forehearth, it will be understood that the principles of such invention are applicable to any burner-fired glass conducting channel or container and may be used to prevent "cold spots" or zones of relatively cool glass at any place or places therein. Various modifications of the invention may be provided without departing from the spirit and scope of the appended claims.

I claim:

1. The combination with a forehearth having a feed spout at its outer end and a channel for conducting molten glass to the feed spout, of burner means for projecting a combustible mixture into the space above the glass in the channel, means for supplying atomizing air to said burner means, means for supplying combustion supporting air locally above the glass in the side portions of the channel, means for supplying combustion supporting air locally above the glass in the outer end portion of said feed spout, and means for connecting said combustion supporting air supply means with said supply of atomizing air, whereby variation in the volume of atomizing air will be attended by a like variation in the volume of air supplied by said other air supply means.

2. The combination with a forehearth having a feed spout at its outer end and a channel for conducting molten glass to the feed spout, of means providing a roughened internal refractory surface above the glass in the outer end portion of the feed spout, means for introducing air into the feed spout to improve combustion adjacent to said roughened surface, a stack at the outer end of the feed spout, and means providing a baffle for preventing products of combustion from entering said stack without impinging against said roughened surface.

3. The combination with a forehearth having a feed spout at its outer end and a channel for conducting molten glass to the feed spout, of means providing a roughened internal refractory surface above the glass in the outer end portion of the feed spout, means for introducing air into the feed spout to improve combustion adjacent to said roughened surface, a stack at the outer end of the feed spout, and means providing a baffle for preventing products of combustion from entering said stack without impinging against said roughened surface, said roughened surface being located in position to radiate heat downwardly onto the glass in the outer end portion of said feed spout.

WILLIAM T. HONISS.